April 12, 1938. C. B. VICKERS 2,114,091
POWER DISTRIBUTING AND EQUALIZER MEANS
Filed Nov. 22, 1935
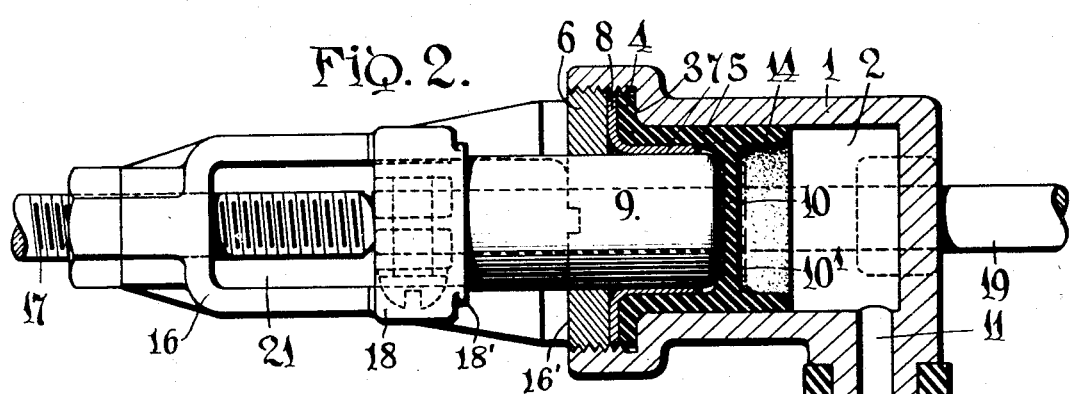
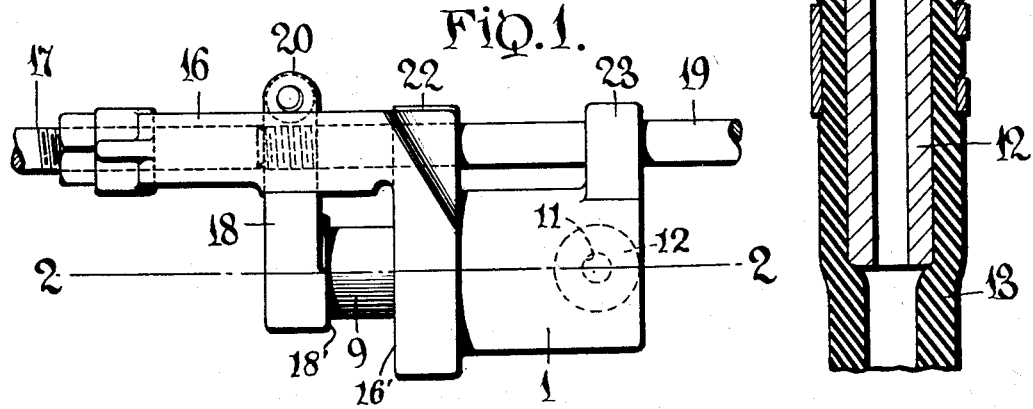
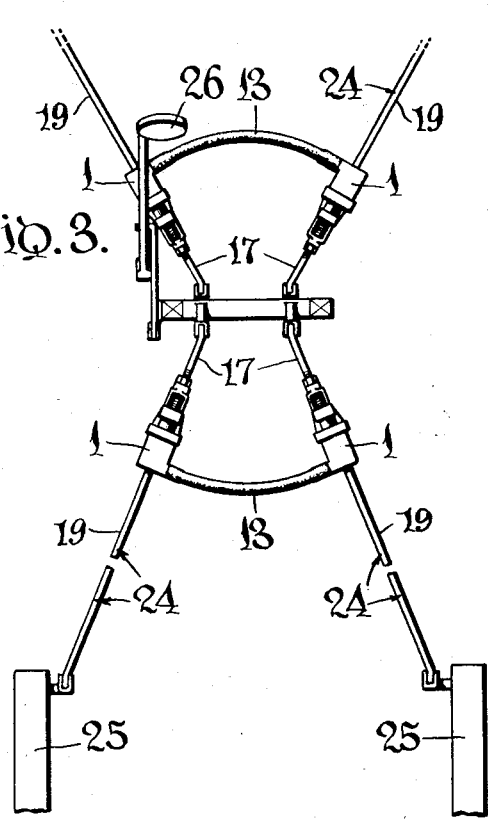
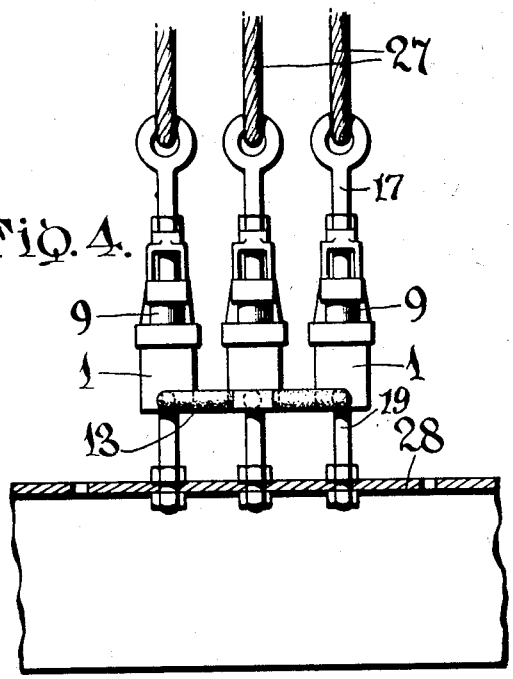
INVENTOR
Carroll B. Vickers,
BY
Beau, Brooks, Buckley & Beau.
ATTORNEYS Patented Apr. 12, 1938

2,114,091

UNITED STATES PATENT OFFICE 2,114,091

POWER DISTRIBUTING AND EQUALIZER MEANS

Carroll B. Vickers, Kenmore, N. Y.

Application November 22, 1935, Serial No. 51,179

13 Claims. (Cl. 188—204)

This invention relates to a power distributing and equalizer means which is applicable to different fields of use for distributing and equalizing the transmission of power or strain between two or more lines of force as well as for cushioning the action of one member against another.

Hydraulic equalizers have heretofore been devised for different uses but they have been faulty and impractical in design and failed to seal the contained liquid against leakage. For these and other reasons they have been unreliable and inefficient for their intended purposes.

The present invention has for its primary object to provide a hydraulic or fluid equalizer or means which will be reliable and serve in an efficient manner against the leakage of fluid from the unit or the system of which it forms a part. A further object of the invention is to provide an improved fluid unit, and sealing means therefor, which will operate efficiently in a pressure equalizing system or other construction wherein fluid is compressed in a chamber through a more or less plunger action.

In the drawing:

Fig. 1 is an elevation of the improved equalizer or fluid link constructed in accordance with the present invention.

Fig. 2 is a partial sectional view thereof taken about on line 2—2 of Fig. 1; and Figs. 3 and 4 illustrate two uses to which the present invention is applicable.

Referring more particularly to the drawing, the numeral 1 designates a cylinder having a chamber 2 of any desired cross section, the chamber being open at one end and provided with an annular shoulder 3 on which is engaged a flange 4 of a resilient fluid confining or sealing member or wall 5. The flange is clampingly secured to the shoulder 3 by a ring nut 6 which latter also serves as a guide for the plunger 9. The fluid confining member 5 is more or less cup shaped and a metallic or other wear resisting sleeve 7 extends within the cylindrical portion of the member 5 and has a peripheral flange 8 interposed between the flange 4 and the ring 6 for being likewise clampingly secured in position. The fluid confining member is distensible into the chamber by the plunger 9 which snugly fits the cylindrical portion and holds the fluid confining member snugly against the walls of chamber 2. The sleeve 7 guides the plunger in its sliding movements and thus facilitates and eases the plunger movements within the rubber cylindrical portion of the fluid confining member 5.

The end wall of the plunger extends transversely and has substantially flat bearing contact upon the bottom wall 10 of the resilient cupped member 5 so that when the plunger is moved inwardly, it will carry the transverse wall or web 10 and distend the resilient member 5 inwardly. Obviously during distention, the rubber will pull away from the side wall portions of the chamber 2.

The chamber 2 is supplied with a quantity of fluid, either gaseous or liquid, or both. Preferably liquid is used where the unit is connected to a like unit for equalizing the transmitted force. Such communication with a like unit is established through a transfer port 11 opening through a nipple 12 and connected by a rubber tub'ng 13 to the companion unit, as shown in Figs. 3 and 4. Consequently if there is more slack in one power line than in the other, the fluid in the intercommunicating chamber will serve to equalize and properly distribute the load or force for greatest efficiency. The rubber tubing 13 may also be used as an expansible chamber under excessive pressure.

While the fluid confining member 5 is being distended it will be attenuated and thus space itself from the chamber wall. Means are however provided to seal the liquid against escape between the member 5 and the chamber wall. To this end resilient member 5 is provided with a flange 14 which preferably has sliding fit with the inner walls of the chamber 2 so as to prevent the seepage of the fluid thereby and backwardly between the opposing walls of members 2 and 5. The excessive pressure to which the fluid is subjected therefore fails to reach the attenuated rubber wall portions of member 5. The rubber wall portions are further supported against rupturing adjacent the point of anchorage on shoulder 3 by the guiding sleeve 7.

The rubber flange 14 is preferably formed integrally with the cupped member 5 and extends inwardly beyond the web or transverse wall 10, so that as the plunger 9 is moved inwardly the sealing flange will be forced outwardly into firmer contact with the chamber walls 2. Such outward movement of the sealing flange will be effected mechanically by the piston and also by the confined liquid. The pressure transmitted by the liquid is increased after the sealing flange has been frictionally locked against the chamber walls, such increased pressure being effected by a small additional movement of the plunger 9, relative to the sealing flange, which is permitted by the yieldable transverse wall or web 10. Such pressure sealing movement of the wall is indicated at 10' and insures against leakage of the confined fluid.

The fluid link or unit may be inserted between any two relatively movable parts for transmitting power or load stress and to this end the cylinder is provided with a mounting bracket 16 to which one section of the load or power line is connected, as indicated at 17, and the plunger in turn is provided with a bracket extension 18 to which the companion line section 19 is connected. The bracket 18 may be split and clamped about the section 19 as by means of a screw 20, if desired, for a firmer connection. The brackets 16 and 18 are designed to cooperate for guiding the parts of the equalizer unit. This may be accomplished by providing the bracket 16 with a guide-way 21 in which the bracket part 18 is guidingly received. For further steadying the mounting of the unit the cylinder may be provided with guiding gears 22 and 23, through which the line section 19 guidingly passes. By this arrangement the power line sections 17 and 19 are disposed in substantial alignment so that in the event of breakage of the resilient member 5 or the leakage of the confined fluid, the two bracket shoulders 16' and 18' will abut one another to provide a mechanical connection between the power line sections. Furthermore, this disposes the fluid cylinder to one side of the power line for ease in connecting one unit to an adjacent cooperating unit when the units are functioning as pressure equalizing parts.

It will be observed that before the positive mechanical connection is effected, an auxiliary cushioning action is provided after the sealing flange or skirt 14 and its supporting end wall 10 are moved sufficiently far into the chamber so that the flange will close the equalizing port 11, thereby trapping a quantity of fluid between the resilient wall 10 and the closed end of the chamber. This will serve to provide a confined body of liquid or fluid within the compressible walls 10 and 14 and provide an emergency cushioning action against a sudden coming together of the bracket parts which might otherwise tend to break such parts and render the device wholly inoperative.

The sealing flange or skirt 14 may be made with a slight flare so as to more snugly fit the chamber walls and for greater efficiency in operation. By reason of this confining flange or skirt the pressure equalizing fluid is restricted primarily to a position in front of the plunger and against leakage back between the cupped shape diaphragm and the chamber walls. The guiding sleeve 7 insures freer movement of the cupped diaphragm as the latter is distended and contracted.

The fluid link or unit is applicable to various uses for absorbing shocks and equalizing stresses and pressures, and by way of illustration, the unit has been illustrated as applicable to only two of its many uses. Where more than one unit is used, the plural units may be formed or connected integrally with the communicating passage 13 embodied in the group formation.

In Fig. 3 the units are interposed in the brake rods of a motor vehicle, generally indicated at 24, the brakes 25 of which are applied by pressure on the brake pedal 26.

If one brake does not have the same adjustment as its companion brake or brakes, then the fluid in advance of the plunger in one chamber 2 will be forced through connecting passage 13 into the more slack fluid link of the companion brake rod and thus equalize the application of the braking pressure as applied to the pedal 26 for equal distribution to the plural brake shoes.

In Fig. 4 the fluid links are interposed in the suspension cables 27 of an elevator car 28 so that the several cables will have the load equally distributed among them and thus insure far greater efficiency in operation and durability.

I claim:

1. A fluid link comprising a fluid containing chamber closed at its inner end and a wall movable in the chamber to compress the fluid therein, said chamber having a passage in its inner end portion for intercommunication with a source of pressure whereby the pressure on the fluid in the chamber and the source will be equalized, said movable wall having fluid tight seal with the chamber side wall and also provided with a sealing flange slidably engaging the chamber wall for being pressed into firm sealing contact with the chamber wall as the pressure on the fluid is increased, and means for effecting relative movement between the wall and chamber, said intercommunicating passage being disposed inwardly beyond the normal position of the sealing flange but adapted to be closed by such sealing flange on extreme movement of the latter into the chamber, whereby to close the chamber against the escape of the entire fluid body contained within the chamber.

2. A fluid link having a fluid containing chamber open at one end, a resilient wall closing the open end of the chamber against fluid leakage, and a plunger for distending the resilient wall into the chamber against the fluid, said resilient wall having side wall portions normally conforming substantially to the chamber side wall, and said plunger having a flat end serving to hold the resilient wall portions in proximity to the chamber wall during such distension.

3. A fluid link having a fluid containing chamber open at one end, a resilient wall closing the open end of the chamber against fluid leakage and extending into the chamber, a plunger for distending the resilient wall axially into the chamber against the fluid, said plunger and resilient wall having contacting portions, and a cup sealing flange carried by the resilient wall inwardly beyond said portions and adapted for sliding contact with the chamber side wall during the distention of said resilient wall to seal the fluid against passage between the distended wall and the chamber wall.

4. A fluid link having a fluid containing chamber open at one end, a resilient wall closing the open end of the chamber against fluid leakage, and a plunger for distending the resilient wall in the chamber against the fluid, said resilient wall having an integral and inwardly projecting sealing flange slidably engaging the chamber side wall.

5. A fluid link having a fluid containing chamber open at one end, a resilient wall closing the open end of the chamber against fluid leakage, and a plunger for distending the resilient wall in the chamber against the fluid, said resilient wall having an annular flange inwardly beyond the plunger, the portion of the resilient wall within the annular flange being yieldable under the action of the plunger to compress the confined fluid outwardly against the packing flange.

6. A fluid link having a fluid containing chamber open at one end, a resilient wall closing the open end of the chamber against fluid leakage, a plunger for distending the resilient wall in the chamber against the fluid, said resilient wall having an annular flange adapted for engaging the chamber wall inwardly beyond the plunger, the portion of the resilient wall within the annular flange being yieldable under the action of the plunger to compress the confined fluid outwardly against the packing flange, and a guiding sleeve for the plunger supporting the latter from sliding contact with the resilient wall.

7. A fluid link comprising a fluid containing chamber open at one end, a resilient wall closing the open end of the chamber against fluid leakage, a plunger for distending the resilient wall into the chamber against the fluid, and an annular sealing flange carried by the resilient wall inwardly of the plunger, said flange being compressible against the chamber side wall and said plunger being movable inwardly relative to the flange for increasing the fluid pressure on the flange to compress the same.

8. A fluid link for connecting relatively movable parts, comprising a fluid containing chamber open at one end, a resilient cup-shape wall closing the open end of the chamber against fluid leakage, and means for distending the resilient wall axially of the chamber and into the latter against a confined body of fluid, said resilient wall having a sealing flange flaring inwardly of said distending means for sliding engagement with the chamber side wall.

9. A fluid link for connecting relatively movable parts, comprising relatively movable members having shoulder portions engageable with each other to provide a mechanical connection therebetween, a fluid containing chamber offset from the shoulder portions, and plunger means operating in the chamber, said plunger means being connected to one of said members and said chamber being connected to the other of said members, said plunger means and chamber acting upon a body of confined fluid, and said shoulder portions interengaging upon leakage of said fluid.

10. A fluid link comprising a cylindrical fluid containing chamber open at one end, a cylindrical resilient wall closing the open end of the chamber against fluid leakage and having its side wall portions lying against the side wall of the chamber, a plunger for distending the resilient wall into the chamber against the fluid, a guiding sleeve removably inserted within the resilient wall for guiding the plunger in its sliding movement and plunger guide means independent of the sleeve and serving to secure the sleeve in position.

11. A fluid link comprising a cylindrical fluid containing chamber open at one end, a cylindrical resilient wall closing the open end of the chamber against fluid leakage and having its side wall portions lying against the side wall of the chamber, a plunger for distending the resilient wall into the chamber against the fluid, and a guiding sleeve within the resilient wall for guiding the plunger in its sliding movement, said sleeve carrying a cylindrical resilient flange engaging the chamber wall for being pressed into firm sealing contact therewith as the pressure on the fluid is increased by the plunger.

12. An extensible wall for closing the open end of a fluid containing chamber and distensible thereinto against the confined fluid and under the action of a plunger, or the like, said wall comprising a resilient body having a portion engageable by the plunger for distention thereby, and a cup sealing flange carried by the resilient body inwardly beyond said portion and adapted for sliding contact with the side wall of the chamber during such distention to seal the confined fluid against passage between the distended portion and the chamber wall.

13. An extensible wall for closing the open end of a fluid containing chamber and distensible thereinto against the confined fluid and under the action of a plunger, or the like, said wall comprising a resilient body having a portion engageable by the plunger for distention thereby, and a cup sealing flange carried by the resilient body inwardly beyond said portion and adapted for sliding contact with the side wall of the chamber during such distention to seal the confined fluid against passage between the distended portion and the chamber wall, the portion of the resilient body within the cup sealing flange being yieldable under the action of the plunger to compress the confined fluid outwardly against the flange.

CARROLL B. VICKERS.